US012570322B2

(12) United States Patent
Hashimoto et al.

(10) Patent No.: US 12,570,322 B2
(45) Date of Patent: Mar. 10, 2026

(54) VEHICLE DETECTION SYSTEM AND METHOD FOR DETECTING A TARGET VEHICLE IN A DETECTION AREA LOCATED BEHIND A SUBJECT VEHICLE

(71) Applicants: AUMOVIO Autonomous Mobility Germany GmbH, Ingolstadt (DE); TOYOTA JIDOSHA KABUSHIKI KAISHA, Toyota (JP)

(72) Inventors: Yuki Hashimoto, Singapore (SG); Takahiro Kohara, Toyota (JP); Tomohiko Mochizuki, Toyota (JP); Takayoshi Nohara, Toyota (JP); Masahiro Takahashi, Toyota (JP)

(73) Assignees: AUMOVIO Autonomous Mobility Germany GmbH, Ingolstadt (DE); TOYOTA JIDOSHA KABUSHIKI KAISHA, Toyota (JP)

( * ) Notice: Subject to any disclaimer, the term of this patent is extended or adjusted under 35 U.S.C. 154(b) by 209 days.

(21) Appl. No.: 18/483,667

(22) Filed: Oct. 10, 2023

(65) Prior Publication Data

US 2024/0132108 A1     Apr. 25, 2024
US 2024/0227859 A9     Jul. 11, 2024

(30) Foreign Application Priority Data

Oct. 19, 2022     (EP) ..................................... 22202530

(51) Int. Cl.
| | |
|---|---|
| *B60W 60/00* | (2020.01) |
| *B60W 50/14* | (2020.01) |
| *G01S 13/931* | (2020.01) |

(52) U.S. Cl.
CPC ........ *B60W 60/0016* (2020.02); *B60W 50/14* (2013.01); *G01S 13/931* (2013.01); *B60W 2420/408* (2024.01); *B60W 2554/80* (2020.02)

(58) Field of Classification Search
CPC ............ B60W 60/0016; B60W 50/14; B60W 2554/80; B60W 2420/408; G01S 13/931
See application file for complete search history.

(56) References Cited

U.S. PATENT DOCUMENTS

| | | | |
|---|---|---|---|
| 2018/0257647 A1 | 9/2018 | Jurca et al. | |
| 2019/0100140 A1* | 4/2019 | Takaki | .................. G01S 13/867 |

(Continued)

FOREIGN PATENT DOCUMENTS

| | | |
|---|---|---|
| JP | 2012-48346 A | 3/2012 |
| JP | 2017-539009 A | 12/2017 |

(Continued)

OTHER PUBLICATIONS

Communication issued Sep. 9, 2025 in Japanese Application No. 2023-175357.

*Primary Examiner* — Naeem Taslim Alam
(74) *Attorney, Agent, or Firm* — Sughrue Mion, PLLC

(57) ABSTRACT

A vehicle detection system configured to judge whether a target vehicle, which has been detected to approach the subject vehicle from behind in a driving lane being used by the subject vehicle and being covered by the detection area is an alert object, to output a result of judgement to a warning which warns a driver of the subject vehicle that a target vehicle (60) is present in the driving lane behind the subject vehicle based on the judging the target vehicle to be an alert object, and to determine, on the basis of a change of a lateral overlap of the target vehicle in the detection area, an overlap change rate which is defined as a ratio of the change of the overlap to a specified time.

16 Claims, 2 Drawing Sheets

AL

DL

X 60   75   65   80   70   DA   50   y

(56)         References Cited

U.S. PATENT DOCUMENTS

| | | | |
|---|---|---|---|
| 2019/0126944 A1 | 5/2019 | Choi | |
| 2020/0391733 A1* | 12/2020 | Kumagai | ............. B60W 10/18 |
| 2021/0197858 A1 | 7/2021 | Zhang et al. | |
| 2023/0322215 A1* | 10/2023 | Patel | ..................... B60K 35/22 |
| | | | 701/26 |

FOREIGN PATENT DOCUMENTS

| | | | |
|---|---|---|---|
| JP | 2019-174320 A | 10/2019 |
| JP | 2021-114274 A | 8/2021 |
| JP | 2022-68115 A | 5/2022 |
| JP | 2022-119260 A | 8/2022 |

* cited by examiner

VEHICLE DETECTION SYSTEM AND METHOD FOR DETECTING A TARGET VEHICLE IN A DETECTION AREA LOCATED BEHIND A SUBJECT VEHICLE

TECHNICAL FIELD

The invention relates to a vehicle detection system for detecting a target vehicle in a detection area located behind a subject vehicle. Furthermore, the invention relates to a method for detecting a target vehicle in a detection area located behind a subject vehicle, particularly for controlling a vehicle detection system.

Moreover, the invention relates to driver assistance system for a vehicle, comprising such a vehicle detection system, a corresponding computer program for carrying out the method and a respective computer-readable medium.

BACKGROUND

Conventional Driver Assistance Systems or Advanced Driver Assistance Systems (ADAS) for vehicles are widely used, for example, in connection with conventional vehicles as well as autonomous vehicles.

Many vehicle accidents are caused by human error, which might have been avoided by means of such Advanced Driver Assistance Systems (ADAS). Commonly known safety-critical ADAS applications include pedestrian detection/avoidance, lane departure warning/correction, traffic sign recognition, automatic emergency braking and blind spot detection, for example. Long range radars are usually used for applications like emergency brake assist and adaptive cruise control, while short-range-radars are often employed in connection with applications like blind spot detection (BSD), rear-cross-traffic-alert, lane-change-assist and rear pre-crash systems, for example.

For example, such rear pre-crash systems track vehicles approaching from behind of a subject vehicle, for example, in a lane or driving lane of the subject vehicle or from an adjacent lane being adjacent to the lane of the subject vehicle and, in the event of an imminent collision, pre-activate safety devices such as indicators (optical or acoustic indicators), airbags, seat belts etc.

In case in such a system a target vehicle which approaches a subject vehicle from behind, is detected by radars which, for example, uses L-RTAN or Long-range Rear Approaching Target Notification for a long range detection area and RTAN or Rear Approaching Target Notification for a short range detection area, triggering of a warning signal by L-RTAN or by RTAN may be considered unnecessary if the target vehicle is changing from the own lane or driving lane of the subject vehicle to an adjacent lane, for example, when the target vehicle is going to pass the subject vehicle (FIG. 2). However, the estimation of a lane change of the target vehicle, for example on the basis of Time-to-Exit (TTE) can be difficult and inaccurate, especially at large distances, because slight variations in the lateral distance and lateral speed (see FIG. 3) of the target vehicle make the target vehicle temporarily appear to be "moving away" laterally from the driving lane. This behavior can erroneously lead to the target vehicle being regarded as a lane-change target vehicle and a warning signal triggered by RTAN and/or L-RTAN possibly being issued late.

SUMMARY OF THE INVENTION

A vehicle detection system according to the invention is for detecting a target vehicle in a detection area located behind a subject vehicle, wherein the vehicle detection system comprises judging means configured to judge whether a target vehicle which has been detected to approach the subject vehicle from behind in a driving lane being used by the subject vehicle and being covered by the detection area is an alert object, to output a result of judgement to warning means which warns a driver of the subject vehicle that a target vehicle is present in the driving lane behind the subject vehicle based on the judging means judging the target vehicle to be an alert object, and to determine, on the basis of a change of a lateral overlap of the target vehicle in the detection area, an overlap change rate which is defined as a ratio of the change of the overlap to a specified time, wherein the judging means is configured to judge the target vehicle to be an alert object or to be not an alert object on the basis of the determined overlap change rate.

By using the overlap change rate, a very accurate determination and prediction of the actual line of travel of the target vehicle as it approaches the subject vehicle in the driving lane can be made. Consequently, unnecessary alarm warnings/activations can be avoided.

The lateral overlap is the distance in the transverse or y-direction of the target vehicle between a reference position or reference line and a side part of the target vehicle which is within the driving lane and which is opposite to the reference line in transverse direction. The reference position or reference line is, for example, a side line of the detection area or a line which borders the driving lane against an adjacent lane which is laterally adjacent to the driving lane.

If the target vehicle is not an alert object, a warning signal from the warning means will be suppressed.

Preferably, the judging means is configured to determine the overlap change rate during lane change of the target vehicle from the driving lane to an adjacent lane. The target vehicle changes the lane in order to pass the subject vehicle. In this case, triggering of a warning signal may be considered unnecessary if the risk of a collision between the target vehicle and the subject vehicle can be excluded.

Furthermore, the judging means may be configured to judge the target vehicle to be not an alert object if the lateral overlap of the target vehicle continuously decreases. This may be interpreted as an indication that the target vehicle will leave the driving lane in time before a critical situation may arise.

Preferably, the overlap change rate which is determined in determination cycles is defined as the difference between an actual lateral overlap and a previous lateral overlap divided by a cycle time. The cycle time is 0.05 s, for example. An overlap change rate warning threshold is defined. The overlap change rate warning threshold is defined to be in the range of −0.2 m/s to −0.5 m/s, for example. Preferably, the overlap change rate warning threshold is −0.35 m/s. The target vehicle is judged to be not an alert object if the overlap change rate exceeds this overlap change rate warning threshold. Thus the judging means allows for precisely distinguishing a target vehicle which continuously approaches the subject vehicle in the driving lane (alert object) from a target vehicle which will change from the driving lane to the adjacent lane (lane-change target vehicle or not an alert object).

Consequently, the vehicle object detection system according to the invention can be further implemented such that the judging means is configured to output a result of judgement to the warning means which result of judgement indicates to the warning means to suppress a warning even if a target object has been detected, based on the judging means judging the target object to be not an alert object.

Also, the vehicle detection system according to the invention can be further modified such that the detection area of the subject vehicle corresponds to a region of the own lane or driving lane behind the subject vehicle and may additionally correspond to the adjacent area being located lateral to the detection area. The adjacent area is preferably an adjacent lane being adjacent to the own lane or driving lane of the subject vehicle. The detection area corresponding to the adjacent lane allows for the determination of overlap change rate during lane-change of the target vehicle while passing the subject vehicle.

A driver assistance system according to the invention is provided for a subject vehicle and comprises detecting means for detecting a target vehicle in a detection area located behind the subject vehicle, the vehicle detection system according to the invention as described above, and warning means for warning a driver of the subject vehicle that a target vehicle is present in the detection area or driving lane only if the judging means of the vehicle detection system judged the target vehicle to be an alert object.

Moreover, the driver assistance system according to the invention can be further configured such that the detecting means comprises radar sensors for detecting a target vehicle in the detection area. The detecting means may also comprise camera sensors to be used in combination with the radar sensors.

Furthermore, the driver assistance system according to the invention can be further modified such that the detecting means comprises radar sensors for Rear Approaching Target Notification (RTAN) and for Long-range Rear Approaching Target Notification (L-RTAN). The judgement of the judging means may be based on either the L-RTAN radar detection or on RTAN radar detection or on both detections.

A vehicle according to the invention, preferably an autonomous vehicle, comprises a driver assistance system according to the invention as described above.

A computer-implemented method according to the invention is for detecting a target vehicle in a detection area located behind a subject vehicle, particularly for controlling a vehicle detection system according to the invention as described above, and comprises the following steps: judging whether a target vehicle which has been detected to approach the subject vehicle from behind in a driving lane being used by the subject vehicle and being covered by the detection area, is an alert object, outputting a result of judgement to warning means which warns a driver of the subject vehicle that a target vehicle is present in the detection area or driving lane behind the subject vehicle based on the judging means judging the target vehicle to be an alert object, determining, on the basis of a change of a lateral overlap of the target vehicle in the detection area, an overlap change rate which is defined as a ratio of the change of the overlap to a specific time and judging the target vehicle to be an alert object or to be not an alert object on the basis of the determined overlap change rate.

Moreover, the method can be further modified such that the overlap change rate is defined as the difference between an actual lateral overlap and a previous lateral overlap divided by a cycle time of a determination cycle, that an overlap change rate warning threshold is set to be in the range of −0.2 m/s to −0.5 m/s and is preferably −0.35 m/s and the target vehicle is judged to be not an alert object if the overlap change rate exceeds this overlap change rate warning threshold.

Accordingly, the properties and advantages explained in connection with the vehicle detection system according to the invention arise in the same or similar manner in respect of the method for detecting a target vehicle in a detection area located behind a subject vehicle according to the present invention, which is why, in order to avoid repetitions, reference is made to the respective explanations with respect to the vehicle detection system according to the invention.

A computer program according to the present invention comprises instructions which, when the program is executed by a computer, cause the computer to carry out the method according to the present invention.

A computer-readable medium according to the present invention has stored thereon the computer program according to the invention.

BRIEF DESCRIPTION OF THE DRAWINGS

Preferred embodiments and advantages of the invention will become more apparent upon reading the following detailed description along with the accompanying drawings in which.

DETAILED DESCRIPTION

With reference to the drawings, one preferred embodiment of the present invention will now be specifically described for illustrative purposes. It is to be understood that components or elements in this embodiment will be shown and described by way of examples only, but are not intended to limit this invention to them.

Figures 1, 2, 3:
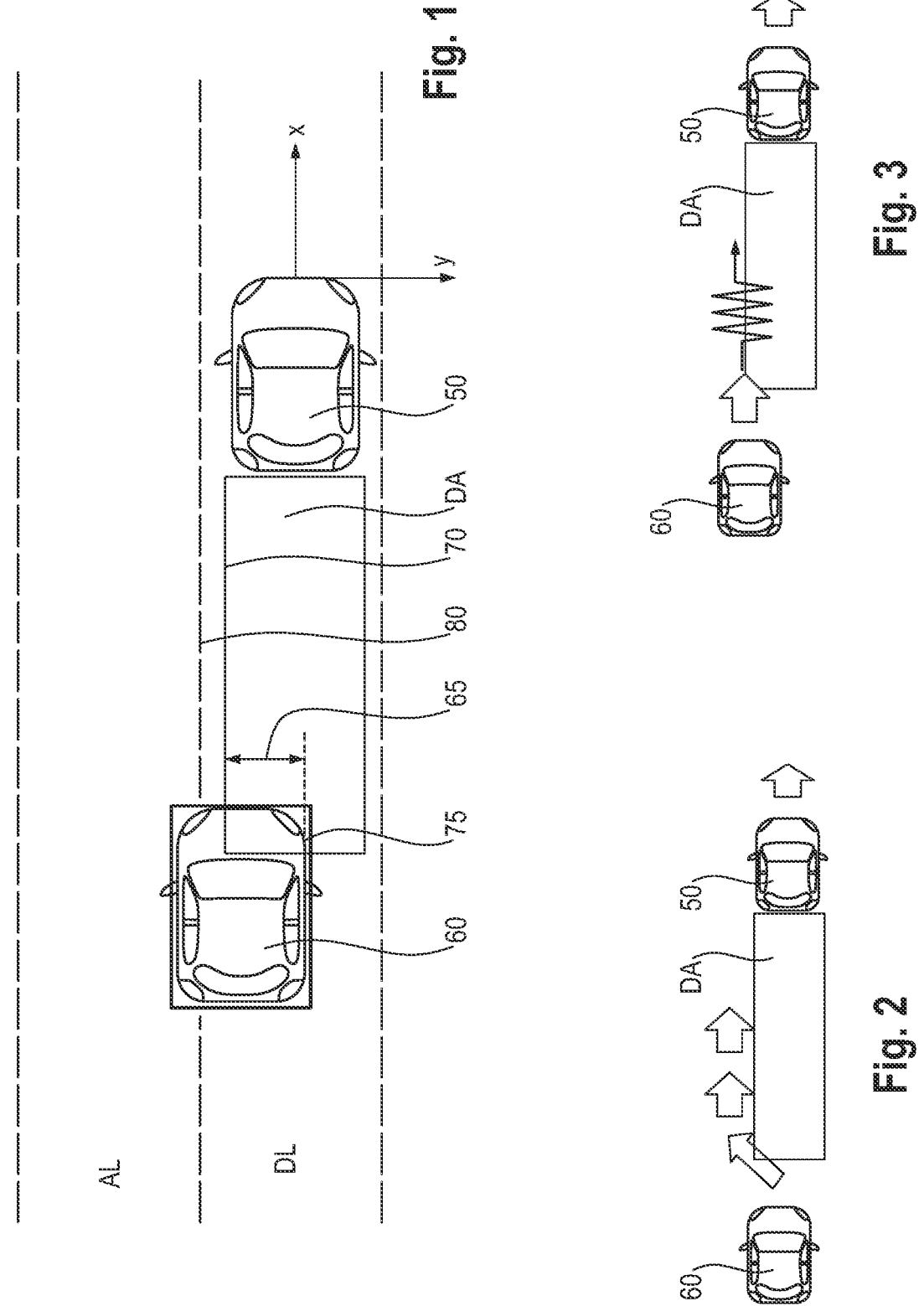
FIG. 1 shows a subject vehicle and a target vehicle approaching the subject vehicle form behind in an overlap position.
FIG. 2 shows a lane-change scenario with a target vehicle approaching a subject vehicle form behind and attending to pass the subject vehicle.
FIG. 3 shows in a lane-change scenario of FIG. 2 the target vehicle with a schematic representation of changing overlap positions.

FIG. 1 shows one embodiment of a vehicle or subject vehicle 50 according to the invention, which is provided with a driver assistance system 1 according to the invention which will be described in connection with FIG. 4.

Figure 4:
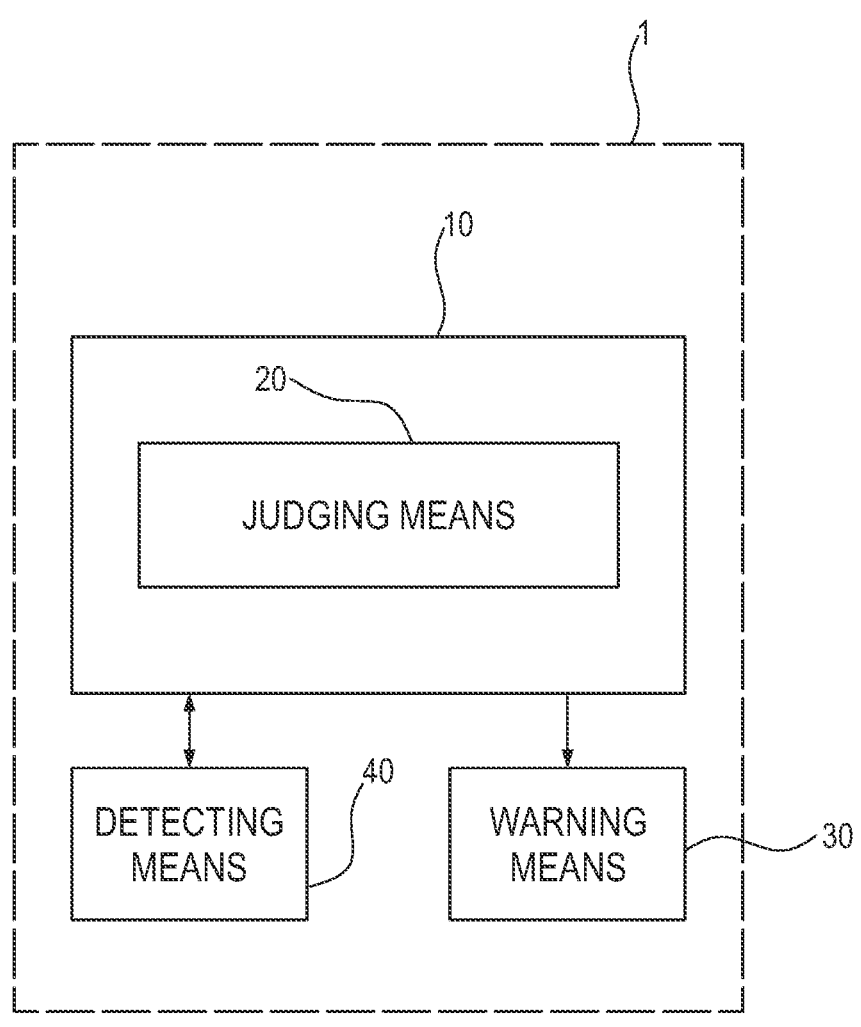
FIG. 4 shows a schematic configuration of a driver assistance system according to the invention.

As can be gathered from FIG. 4, the driver assistance system 1 provided in the subject vehicle 50 comprises a vehicle detection system 10 according to the invention, detecting means 40 and warning means 30.

The detecting means 40 is for detecting a target vehicle 60 in a detection area DA located behind the subject vehicle 50, which will be described below.

In this embodiment, the detecting means 40 comprises radar sensors for detecting a target vehicle 60 in the detection area DA. These sensors may be part of a conventional (rear-) cross-traffic alert system, for example, and are capable of detecting at least a relative position of the target vehicle 60 with respect to the subject vehicle 50, a relative speed/velocity of the target vehicle 60 with respect to the subject vehicle 50, respectively, in the x- and y-directions as shown in FIG. 1. In this case, the x-direction shown in FIG. 1 corresponds to the longitudinal direction of the subject vehicle 50 and the target vehicle 60, while the y-direction shown in FIG. 1 corresponds to the transverse direction of the subject vehicle 50 and the target vehicle 60.

Preferably, the detecting means 40 comprises radar sensors for Rear Approaching Target Notification (RTAN) and for Long-range Rear Approaching Target Notification (L-RTAN). The judgement of the judging means may be based on either the L-RTAN radar detection or on RTAN radar detection or on both detections.

The warning means 30 is for warning a driver of the subject vehicle 50 that a target vehicle 60 is present in the detection area DA. For example, the warning means 30 may be a conventional visual or audible indicator (display or speaker) capable of notifying the driver of the subject vehicle 50 that the target vehicle 60 is present in the detection area DA and, for example, may fall below a safety distance from the subject vehicle 50.

The vehicle detection system 10 according to the invention can be formed by a computer or processor and is in particular for detecting a target vehicle 60 in the detection area DA located behind the subject vehicle 50. The detection area DA of the subject vehicle 50 (FIG. 1) corresponds, in particular in the width or in the transverse direction, completely or to a certain extent to an area of the driving lane DL of the subject vehicle 50. The detection area DA may also comprise, completely or to a certain extent, the adjacent area or adjacent lane AL being located lateral/adjacent to the detection area DA or the driving lane DL and to which the target vehicle 60 changes for passing the subject vehicle 50.

The vehicle detection system 10 comprises judging means 20 for judging whether a target vehicle 60 which has been detected to enter the detection area DA is an alert object or no alert object, and for outputting a result of judgement to the warning means 30.

While approaching the subject vehicle 50 from behind the target vehicle 60 changes from the driving lane DL to the adjacent lane AL in order to pass the subject vehicle 50. The target vehicle 60 occupies the driving lane DL with a lateral overlap 65. The lateral overlap 65 is the distance in y-direction between a reference position or reference line 70 and the side part 75 of the target vehicle 60 which is within the driving lane DL and which is opposite to the reference line 70. This side part 75 of the target vehicle 60 is, for example, on the right side of the target vehicle 60 according to the representation in FIG. 1. The reference line 70 is, for example, the sideline of the detection area DA or the sideline 80 of the driving lane DL bordering the adjacent lane AL, dependent of the size or width of the detection area DA. The lateral overlap 65 therefore corresponds to the proportion of the target vehicle's width with which the target vehicle 60 is actually in the driving lane DL. During lane change of the target vehicle 60 from the driving lane DL to the adjacent lane AL the size of the lateral overlap 65 decreases, in particular continuously. This change of size of the lateral overlap 65 is detected by the detecting means 40.

The judging means 20 determines an overlap change rate on the basis of the changing lateral overlap 65 of the target vehicle 60 during lane change. Such, the overlap change rate represents the change in size of the lateral overlap 65 over time, for example, over a specified time like a cycle time of a determination cycle. The determination of the overlap change rate is carried out in cycles with a cycle time of 0.05 s, for example.

Preferably, the overlap change rate is defined as the difference between an actual lateral overlap and a previous lateral overlap divided by a cycle time. Furthermore, an overlap change rate warning threshold is defined to be in the range of −0.2 m/s to −0.5 m/s and is preferably −0.35 m/s. The target vehicle 60 is judged to be not an alert object or no alert object if the overlap change rate exceeds this overlap change rate warning threshold.

Thus, the judging means 20 is configured to judge the target vehicle 60 to be an alert object or to be not an alert object on the basis of the overlap change rate during lane change.

Accordingly, the warning means 30 warns the driver of the subject vehicle 50 that a target vehicle 60 is present in the detection area DA only if the judging means 20 judged the target vehicle 60 to be an alert object. In the other case, no warning is output. That is, the warning means 30 is configured to output a warning to the driver of the subject vehicle 50 that a target vehicle 60 is present in the detection area DA if the judging means 20 judges the target vehicle 60 to be an alert object and to suppress output of a warning even if a target vehicle 60 is detected in the detection area DA by the detecting means 40, if the judging means 20 judged the target vehicle 60 to be not an alert object.

The features of the invention disclosed in the foregoing description, in the drawings as well as in the claims may be essential for the realization of the invention both individually and in any combination.

The invention claimed is:

1. A vehicle detection system (10) for detecting a target vehicle (60) in a detection area (DA) located behind a subject vehicle (50), the vehicle detection system (10) comprising:

judging means (20) configured to judge whether a target vehicle (60) which has been detected to approach the subject vehicle (50) from behind in a driving lane (DL) being used by the subject vehicle (50) and being covered by the detection area (DA) is an alert object, to output a result of judgement to warning means (30) which warns a driver of the subject vehicle (50) that the target vehicle (60) is present in the driving lane (DL) behind the subject vehicle (50) based on the judging means (20) judging the target vehicle (60) to be an alert object, and to determine, on the basis of a change of a lateral overlap of the target vehicle (60) in the detection area (DA), an overlap change rate which is defined as a ratio of the change of the overlap to a specified time, wherein the judging means (20) is configured to judge the target vehicle (60) to be an alert object or to not be an alert object on the basis of the determined overlap change rate.

2. The vehicle detection system (10) according to claim 1, wherein the judging means (20) is configured to determine the overlap change rate during lane change of the target vehicle (60) from the driving lane (DL) to an adjacent lane (AL).

3. The vehicle detection system (10) according to claim 1, wherein the judging means (20) is configured to judge the target vehicle (60) to not be an alert object if the lateral overlap of the target vehicle (60) continuously decreases.

4. The vehicle detection system (10) according to claim 1, wherein the overlap change rate is defined as the difference between an actual lateral overlap and a previous lateral overlap, divided by a cycle time of a cycle.

5. The vehicle detection system (10) according to claim 1, wherein an overlap change rate warning threshold is defined to be in the range of −0.2 m/s to −0.5 m/s, and the target vehicle (60) is judged to not be an alert object if the overlap change rate exceeds this overlap change rate warning threshold.

6. The vehicle detection system (10) according to claim 1, wherein the judging means (20) is configured to output a result of judgement to the warning means (30) which result of judgement indicates to the warning means (30) to suppress a warning even if a target vehicle (60) has been detected, based on the judging means (20) judging the target vehicle (60) to not be an alert object.

7. A driver assistance system (1) for a subject vehicle (50), comprising:

detecting means (40) for detecting the target vehicle (60) in a detection area (DA) located behind the subject vehicle (50), the vehicle detection system (10) according to claim 1, and warning means (30) for warning a driver of the subject vehicle (50) that the target vehicle (60) is present in the detection area (DA) or driving lane (DL) only if the judging means (20) of the vehicle detection system (10) judged the target vehicle (60) to be an alert object.

8. The driver assistance system according to claim 7, wherein the detecting means (40) comprises radar sensors for detecting the target vehicle (60) in the detection area (DA).

9. The driver assistance system according to claim 8, wherein the detecting means comprises radar sensors for Rear Approaching Target Notification (RTAN) and for Long-range Rear Approaching Target Notification (L-RTAN) and wherein the judgement of the judging means is based on at least one of the L-RTAN radar detection and the RTAN radar detection.

10. A vehicle comprising a driver assistance system according to claim 7.

11. The vehicle of claim 10, wherein the vehicle is an autonomous vehicle.

12. A computer-implemented method for detecting a target vehicle (60) in a detection area (DA) located behind a subject vehicle (50), particularly for controlling a vehicle detection system (10) according to claim 1, wherein the method comprises the following steps:

judging whether a target vehicle (60) which has been detected to approach the subject vehicle (50) from behind in a driving lane (DL) being used by the subject vehicle (50) and being covered by the detection area (DA), is an alert object, outputting a result of judgement to warning means (30) which warns a driver of the subject vehicle (50) that the target vehicle (60) is present in the detection area (DA) or driving lane (DL) behind the subject vehicle (50) based on the judging means (20) judging the target vehicle (60) to be an alert object, determining, on the basis of a change of a lateral overlap of the target vehicle (60) in the detection area (DA), an overlap change rate which is defined as a ratio of the change of the overlap to a specific time, and judging the target vehicle (60) to be an alert object or to not be an alert object on the basis of the determined overlap change rate.

13. The method according to claim 12, wherein the overlap change rate is defined as the difference between an actual lateral overlap and a previous lateral overlap divided by a cycle time of a cycle for the determination of the overlap change rate, an overlap change rate warning threshold is defined to be in the range of −0.2 m/s to −0.5 m/s, and the target vehicle (60) is judged to not be an alert object if the overlap change rate exceeds this overlap change rate warning threshold.

14. A non-transitory computer-readable medium having stored thereon a computer program comprising instructions which, when the program is executed by a computer, cause the computer to carry out the method of claim 12.

15. The vehicle detection system (10) according to claim 1, wherein the overlap change rate warning threshold is defined to be −0.35 m/s.

16. The method according to claim 13, wherein the overlap change rate warning threshold is −0.35 m/s.

* * * * *